United States Patent [19]
Renfro

[11] Patent Number: 4,862,915
[45] Date of Patent: Sep. 5, 1989

[54] ROTARY ACTUATED DISC VALVE
[75] Inventor: Wesley E. Renfro, St. Amant, La.
[73] Assignees: Curtis L. Cooper; Joseph L. Kling, III, both of Gonzales, La.
[21] Appl. No.: 248,142
[22] Filed: Sep. 23, 1988
[51] Int. Cl.[4] .............................................. F16K 37/00
[52] U.S. Cl. ................................ 137/556; 137/625.31; 251/59; 251/249.5
[58] Field of Search .............. 251/367, 59, 248, 249.5; 137/556, 625.31

[56] References Cited
U.S. PATENT DOCUMENTS

| | | | |
|---|---|---|---|
| 1,192,689 | 7/1916 | Sayer | 137/625.31 |
| 2,037,663 | 4/1936 | Lalor | 137/556 |
| 2,811,834 | 11/1957 | Shafer | 251/59 |
| 2,883,150 | 4/1959 | Musser | 251/248 |
| 4,328,831 | 5/1982 | Wolff | 251/59 |
| 4,549,579 | 10/1985 | Bergmann | 137/625.31 |

Primary Examiner—A. Michael Chambers
Attorney, Agent, or Firm—William David Kiesel; Timothy J. Monahan; Robert C. Tucker

[57] ABSTRACT

A straight line disc valve for high pressure fluids is provided having a valve housing with an internal cylindrical chamber. A cylindrical rotor is aligned within the chamber with each end of the rotor being pivotable on a stationary disc within the housing. A passageway through the discs and rotor is alternately opened and closed by rotating the rotor. The rotor is actuated by hydraulic fluid acting on vanes radiating from the circumference of the rotor. Alternatively, the rotor is actuated by a gear positioned on the circumference of the rotor and rotatable within the housing. The first gear is driven by a second gear in communication with an outside power source.

8 Claims, 8 Drawing Sheets

ROTARY ACTUATED DISC VALVE

BACKGROUND OF THE INVENTION

1. Field of the Invention.

This invention relates generally to disc valves and particularly to a rotary actuated straight line disc valve with a hydraulic or mechanical actuator.

2. Prior Art.

Controlling the flow of fluids from high pressure fluid sources such as oil and gas wells requires specialty equipment. Pressures as high as 20,000 pounds per square inch is commonly found in the oil field and pressures as high as 50,000 pounds per square inch are occasionally encountered. Besides the high pressures involved, the fluid itself also presents special problems. Grit and other particulate matter is easily entrained in the high pressure fluid flow. Additionally, the flow itself can be unpredictable, often having slugs of liquid mixed with gas.

Generally, the prior art high pressure valves use a right angle configuration. That is, the fluid enters the valve housing through an inlet passageway and makes a right angle turn through a discharge outlet. The actuating means, whether plug type or disc type, is generally positioned at the corner of the right angle. The actuator itself is generally aligned with the discharge outlet. Because of the aforementioned characteristics of the fluid flowing through the valve, these prior art valves are particularly prone to wear at the site of the turn. One method used to buffer the force of the fluid is shown in U.S. Pat. No. 4,493,336. However, even with the aforementioned improvements, the actuator portion of the valves tend to be large, often accounting for the majority of the bulk of the valve. Another shortcoming of the prior art valve actuators are that they contain several mechanical linkages thereby introducing unwanted hysteresis in the control mechanism.

High pressure valves present special problems with regard to seals. In the prior art valves, seals are exposed to the fluid being regulated and are subject to stress from heat, high pressure, chemical attack and abrasion. Typically, the seals are made of polymers which are specially formulated to withstand extremes in operating conditions.

SUMMARY OF THE INVENTION

Therefore, one object of this invention is to provide a straight line, high pressure valve.

Another object of this invention is to minimize or eliminate mechanical linkage in the valve.

Another object of this invention is to protect nonmetallic seals from physical and chemical stress.

Another object of this invention is to provide a valve which constricts flow at two distinct interfaces.

Still another object of the invention is to protect the internal parts of the valve from the impact of entrained liquid and solids.

Accordingly, a high pressure disc valve is provided having a housing with an internal chamber in which a cylindrical rotor is positioned. Each end of the rotor has a flat surface slidable on a corresponding flat surface of the housing at each end of the chamber. A fluid passageway extends through the housing and rotor. The passageway is offset from the axis of the rotor so that rotating the rotor aligns or closes the passageway. The rotor is actuated by a gear encircling the rotor or by hydraulic fluid acting upon vanes extending radially from the rotor which travel within an arcuate channel within the housing.

DESCRIPTION OF THE PREFERRED EMBODIMENT

A detailed description of the preferred embodiment of the invention is set forth below.

Generally, the invention is a rotary disc valve having a hydraulic actuator with manual override capability. The actuators are positioned on the circumference of the rotor, out of the line of the fluid flow, making a straight line valve configuration possible. The valve is lined with wear parts made up of stationary discs positioned in each of the inlet and outlet flanges and a cylindrical core keyed to the rotor. Passageways through the wear parts are offset from the axis of the rotor so that rotating the rotor aligns or closes the passageways.

Figure 1:
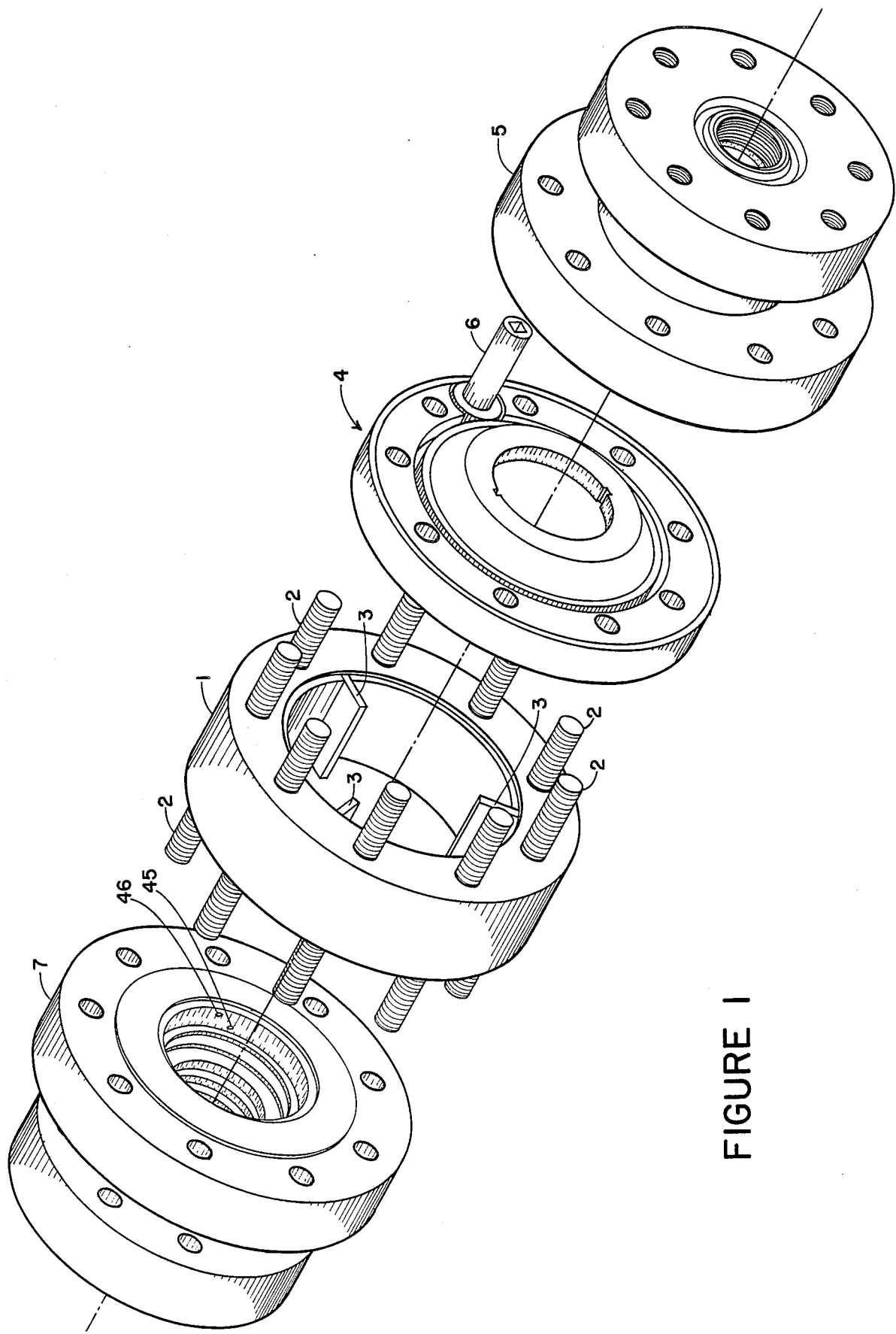
FIG. 1 is an exploded view of the valve housing.

FIG. 1 is an exploded view of what has been generally termed the housing. The centerpiece 1 is a ring with a plurality of bolts 2 extending from either side. Radiating inward from the inside diameter of centerpiece 1 are vanes 3 which divide a hydraulic channel as described in more detail below. Mechanical actuator 4 is fitted over bolts 2 followed by outlet flange 5. Nuts (not shown) secure the aforementioned parts. Shaft 6 extends through a hole in outlet flange 5 and is accessible from the exterior of the valve as shown by the dashed outline in the lower right hand portion of FIG. 5. Inlet flange 7 is fitted over bolts 2 and secured to the opposite side of centerpiece 1 to complete the valve housing.

Figure 2:
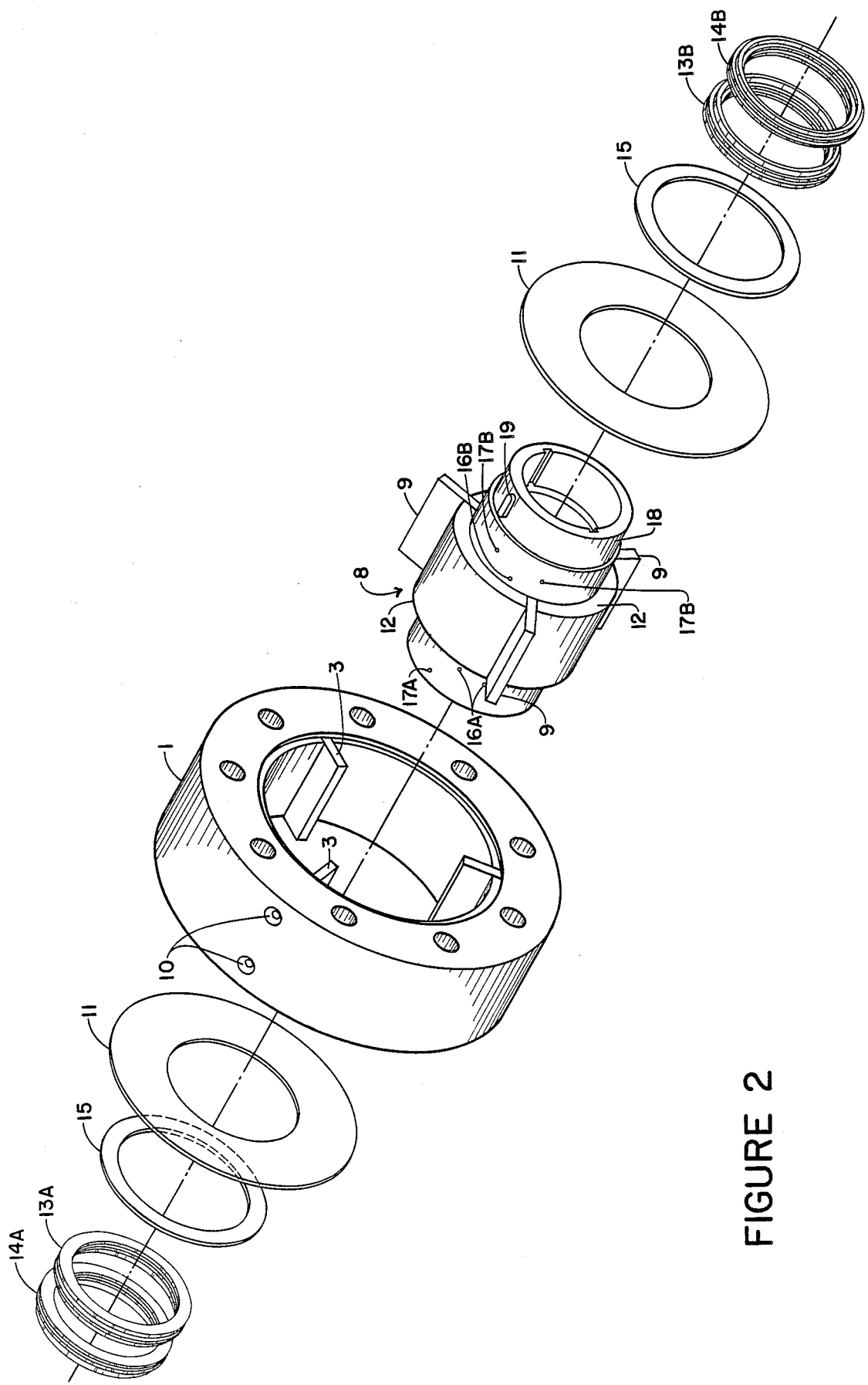
FIG. 2 is an exploded view of the hydraulic rotor actuator.

Referring to FIG. 2, rotor 8 fits within centerpiece 1. Vanes 9 radiating outward from rotor 8 form a seal with the inside diameter of centerpiece 1. Likewise, vanes 3 from centerpiece 1 form a seal with the outside diameter of rotor 8. Vanes 3 divide a channel between the outside diameter of rotor 8 and the inside diameter of centerpiece 1 into three equal, arcuate portions. Vanes 9 in turn divide each of the three arcuate channels into two segments. Hydraulic fluid directed into one or the other of the segments exerts pressure on a side of vane 9 causing rotor 8 to rotate. Vanes 3 of centerpiece 1 are secured by screws 10 entering from the exterior centerpiece 1.

The ends of the annular channel between the rotor 8 and centerpiece 1 are sealed by thrust plates 11 which abut shoulders 12 and the ends of both sets of vanes 3 and vanes 9. As will be shown in greater detail in FIG. 10, the faces of vanes 3 and 9 are covered by rectangular gaskets which help seal against leaks of hydraulic fluid.

Figure 7:
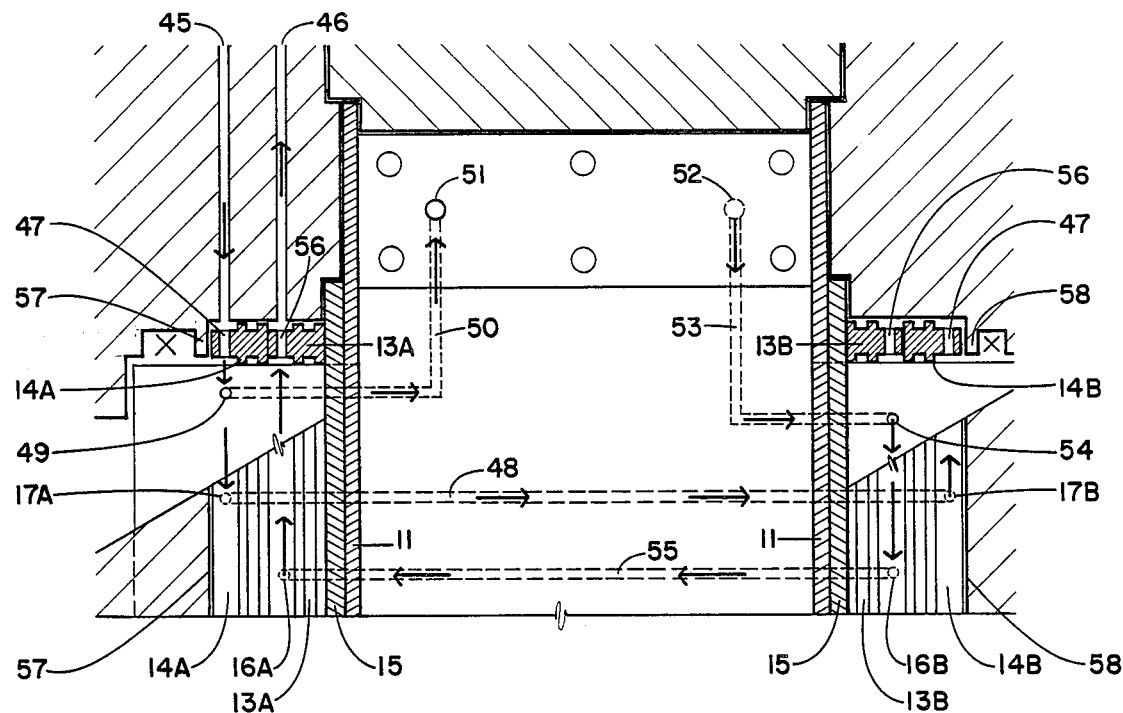
FIG. 7 is a side view of the rotor showing hydraulic fluid flowing from the high port to the front of the vane.
Figure 8:
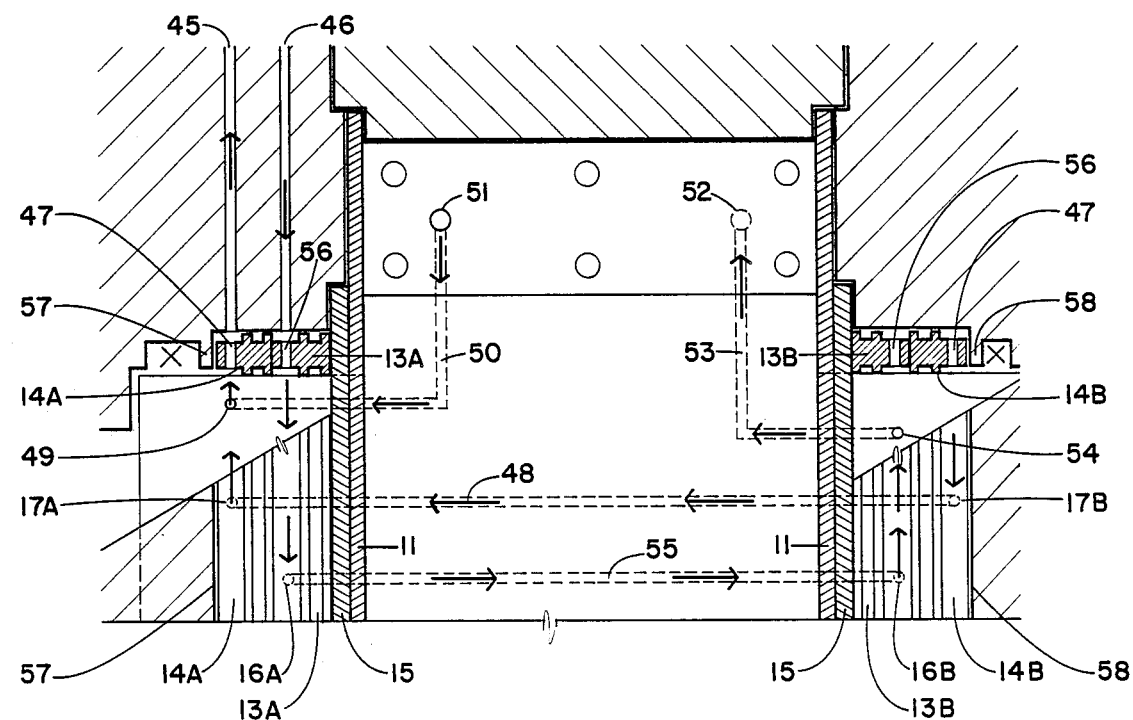
FIG. 8 is a side view of the rotor showing hydraulic fluid flowing from the low port to the back of the vane.

The thrust plates 11 are urged inward by low pistons 13A and 13B referred to generally as 13, and high pistons 14A and 14B referred to generally as 14. Gaskets 15 are placed between thrust plates 11 and low pistons 13. Pistons 13 and 14 are driven inward by hydraulic fluid entering through hydraulic passageways in the side of inlet flange 7 designated 45 and 46 in FIG. 1. Hydraulic passageways through rotor 8 allow hydraulic fluid from low port 16A on one end of rotor 8 to flow to low port 16B on the other side of rotor 8. Similarly, a hydraulic passageway is provided between high ports 17A and 17B. The dynamic of the hydraulic fluid flow within the hydraulic actuator is shown in FIG. 7 and 8 and are discussed in detail later.

In the preferred embodiment, three rotor vanes 9 operate within three arcuate portions of the annular channel formed by vanes 3 between rotor 8 and centerpiece 1. However, those with skill in the art will recognize that a single vane directed by hydraulic fluid within a single arcuate channel may be used to accomplish the same task of actuating rotor 8.

Rotor 8 is also designed to accommodate means for mechanical actuation. Neck 18 provides a site to engage mechanical actuator 4 to rotor 8. Key 19 joins rotor 8 to a gear which can be fitted over neck 18.

Figure 4:
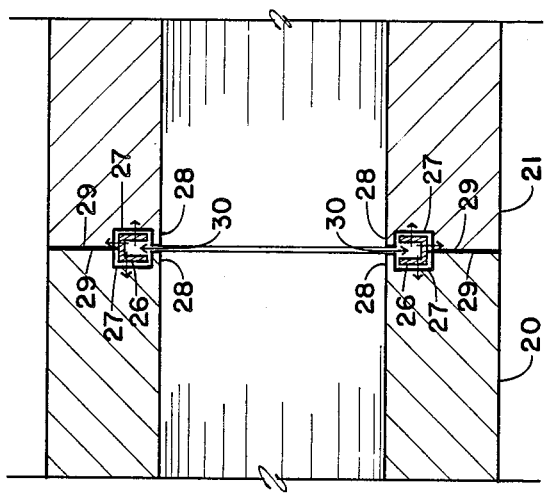
FIG. 4 is a cross section of the static seal between the center wear parts.
Figure 3:
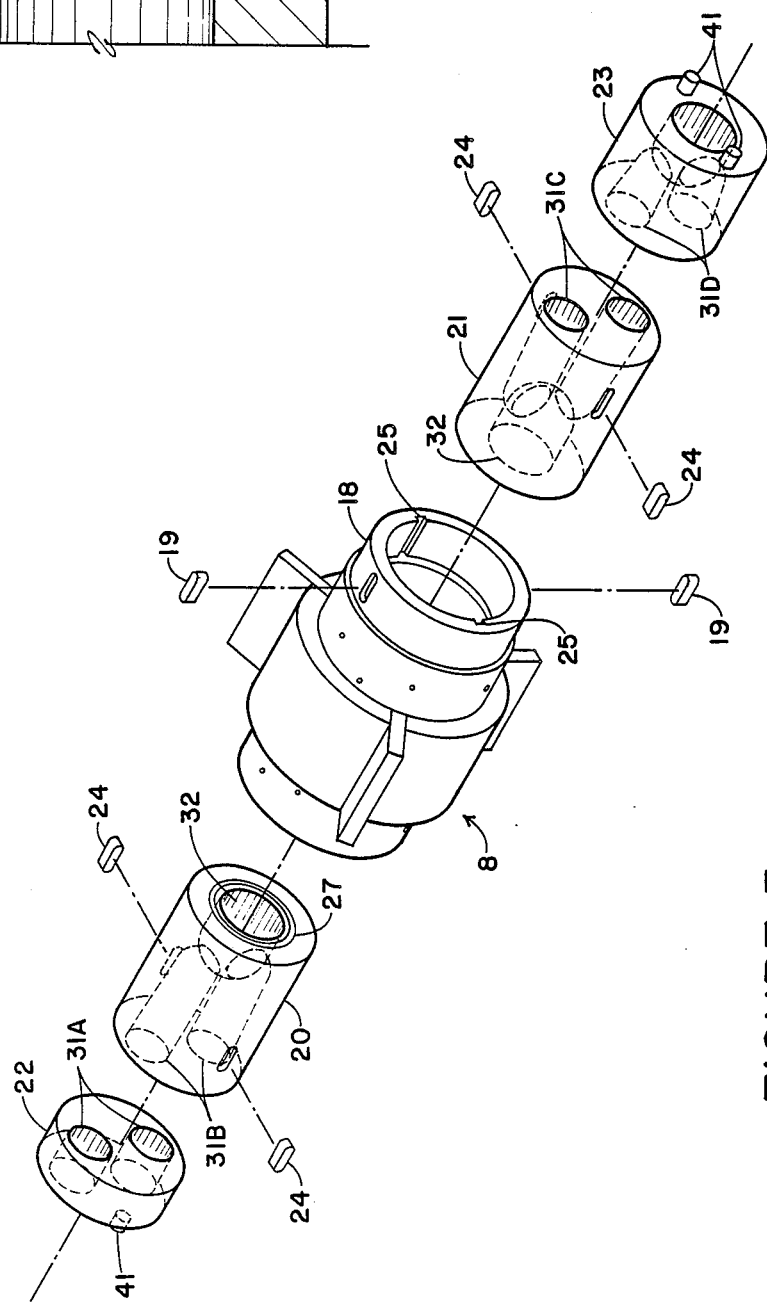
FIG. 3 is an exploded view of the rotor and wear parts.

FIG. 3 is an exploded view of rotor 8 and wear parts 20-23. The center wear parts 20 and 21 are keyed to rotor 8 by keys 24 which engage slots 25 in the inside diameter of rotor 8. Referring to FIG. 4, stationary seal 26 is seated in grooves 27 in each of center wear parts 20 and 21. The inside lip 28 of groove 27 is recessed from the face 29 of at least one of the center wear parts. The fluid being controlled exerts pressure on seal 26 through gap 30 between center wear parts 20 and 21. Seal 26 is preferably made from a metal which is deformable under the operating pressures of the valve. An example of a material which may be used for the seal is 316 stainless steel. Seal 26 has a "U" shaped cross section to cup the high pressure fluid. As fluid pressure increases, seal 26 is pressed tighter against the bottom and outside of grooves 27.

Referring back to FIG. 3, besides the two center wear parts 20 and 21 which pivot with rotor 8, there are two stationary wear parts 22 and 23 which are seated in the inlet flange and outlet flange respectively. There are two interfaces where fluid flowing through the valve is controlled. This first is the interface between inlet stationary disc 22 and the inlet side of center wear part 20 and the second is at the interface between the outlet side of center wear part 21 and outlet stationary disc 23. At each of these interfaces there are a pair of openings 31A-D in the face of each the four wear parts. The openings are offset from the axis of rotor 8 making it possible to provide an open passageway or to choke off flow by turning rotor 8. An additional feature of the center wear parts 20 and 21 is expansion chamber 32. An expansion chamber provides a buffer to decrease erosion and impact damage caused by high velocity fluid flow through the valve. Additionally, expansion chamber 32 may be used as a mixing zone if two different streams are fed through the valve. Check valves may be installed upstream to prevent back mixing.

Those with skill in the art will recognize that the general principles disclosed in the preferred embodiment may be adapted to alternate embodiments. For example, instead of two openings or passageways at each interface, there could be just one offset from the rotor axis. Likewise, instead of controlling fluid flow at two interfaces, openings at one of the interfaces could be co-axial, and therefore aligned open at all times.

Wear parts are employed as replaceable inserts which are exposed to the abrasion, impact and corrosion caused by the fluid being controlled. Examples of suitable material from which to construct the wear parts are tungsten carbide, ceramic composites and Stellite TM, a product of Union Carbide Corp. In a broader sense, the wear parts themselves are a component of the permanent parts with which they are associated. For example, the stationary discs 22 and 23 in the flanges can be considered as part of the housing. Likewise, the center wear parts 20 and 21 are part of the rotor. If little abrasion is expected, it may not be necessary to use wear parts or replaceable inserts in the flanges and rotor. The interior portion of each flange in communication with the ends of the rotor could be machined smooth and bored to correspond to the bore through the rotor.

Figure 5:
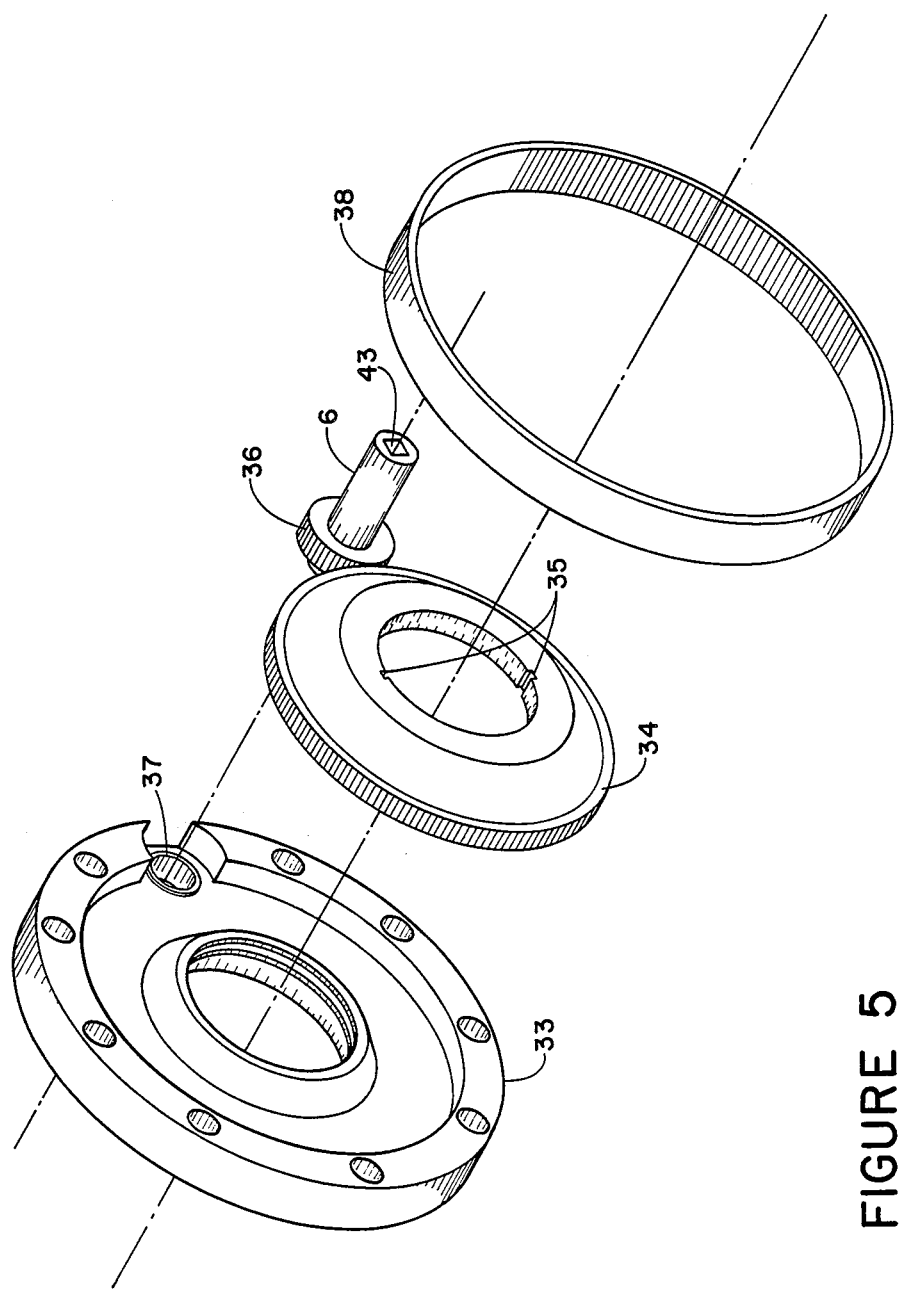
FIG. 5 is an exploded view of the mechanical actuator.

FIG. 5 is an exploded view of the mechanical actuator 4. Spacer ring 33 fits over bolts 2 and against the outlet side of centerpiece 1 as shown in FIG. 1. Spacer ring 33 is recessed to provide room for a first gear 34 to rotate within the valve housing. Gear 34 fits over neck 18 of rotor 8. Slots 35 in the inside diameter of gear 34 engage keys 19 in neck 18. Gear 34 is turned by drive gear 36 mounted on shaft 6. An end of shaft 6 is aligned in bushing 37 in spacer ring 33. Depending on the diameter of drive gear 36, bushing 37 may or may not be centered on the same radius as the bolt holes in spacer ring 33. Indicator ring 38 fits around spacer ring 33 and has teeth on its inside diameter which engage drive gear 36. When rotor 8 is rotated, either hydraulically or by drive gear 36, indicator ring 38 rotates a corresponding distance. The outside diameter of indicator ring 38 can be calibrated to indicate whether the valve is open, partially open or closed.

The method of mechanical actuation of the rotor is not intended to be limited to a first gear keyed to the rotor and a drive gear aligned parallel to the first gear. Those with skill in the art may adopt a worm gear or rack and pinion mechanical actuator. Another modification included within the scope of the invention is to cut teeth or notches directly in neck 18 or rotor 8. The 'gear' which is driven is then the rotor itself rather than a first gear keyed to the rotor. In the above examples it is preferred that the circumference or cylindrical perimeter of the rotor be engaged by the actuator, placing the actuator mechanism out of the line of fluid flow through the valve. Instead of a plurality of teeth aligned on the circumference of rotor 8, an arm or single "tooth" could be extended radially through a slot in the valve housing. Any of a number of methods could be used to pivot the arm. However, because a slot cut in the housing is likely to weaken the valve and because a protruding arm or lever is less safe than internal mechanisms, this method of actuation is not preferred.

Figure 6:
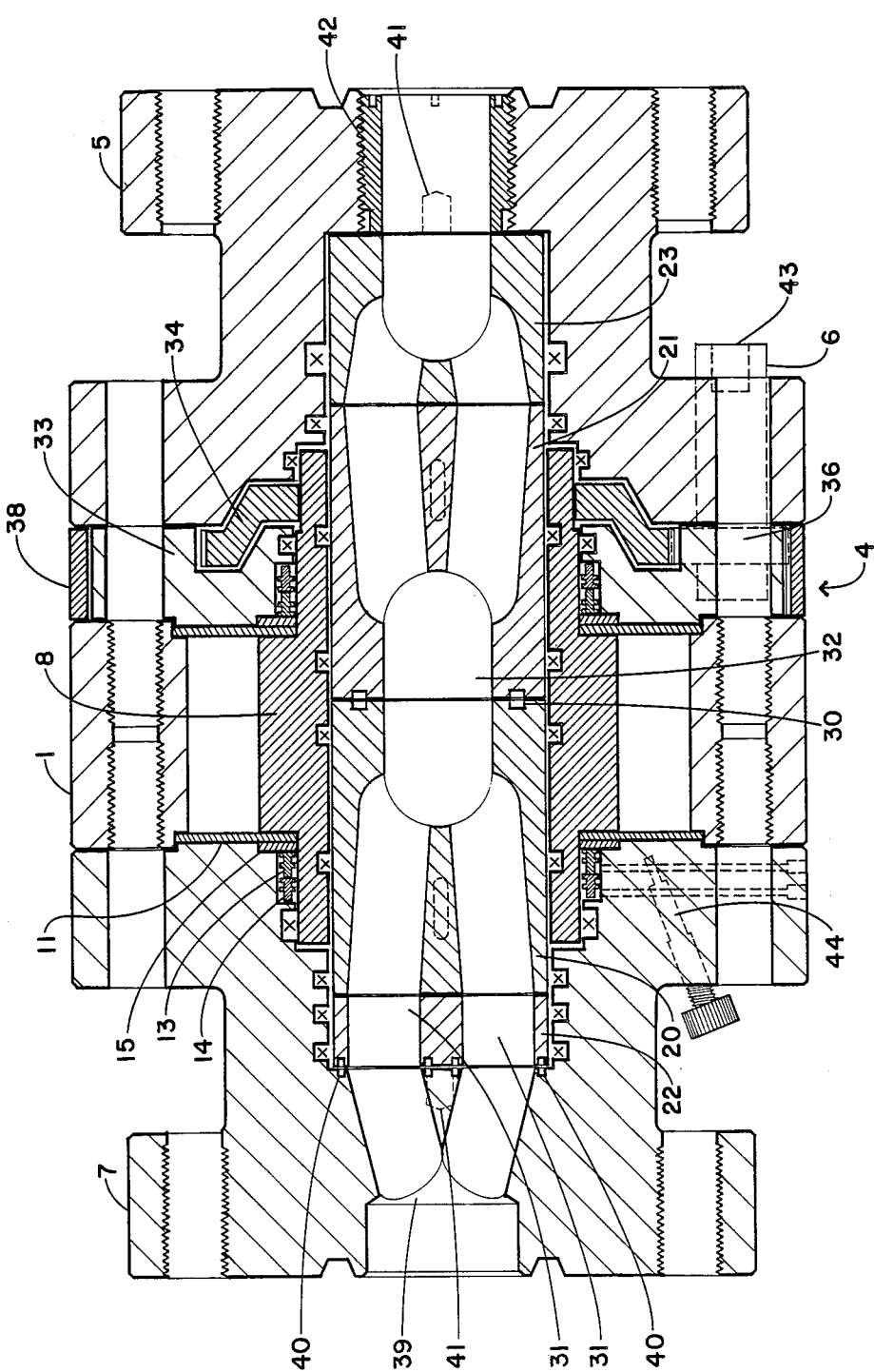
FIG. 6 is a cross section of the valve.

Referring to FIG. 6, a cross section of the assembled valve is shown. The fluid to be controlled enters the valve at inlet flange 7 where it is split into two streams by impact shield 39. Preferably, impact shield 39 is part of inlet flange 7 making it possible to absorb the shock of irregularities and debris in the flowing fluid. The wear parts themselves tend to be brittle and can be shattered without protection.

Moving from left to right across FIG. 6, the split flow enters inlet stationary disc 22 which is seated in a recess within inlet flange 7. Stationary seals 40, comparable to stationary seal 26 between the center wear parts 20 and 21, are provided between inlet flange 7 and each of the inlet openings in inlet stationary disc 22.

In FIG. 6, rotor 8 is oriented to align openings 31 and permit flow through the valve. At the interface between inlet stationary disc 22 and center wear part 20, the surface of each wear part is lapped to create a flat, planar surface, perpendicular to the axis of rotor 8, which seals flow when the valve is closed. Likewise, at the interface between center wear part 21 and outlet stationary disc 23, the wear parts are lapped to a flat smooth surface. While in the preferred embodiment disclosed herein the interfaces between the center wear parts and stationary wear parts are planer, other configurations may be substituted. For example, the stationary wear part could have a concave face while the center wear part could have a convex face matable therewith. It is important for obtaining the maximum seal that the wear parts be matingly slidable through the angle of rotation of rotor or in other words that the surfaces be uniform about the axis or rotation.

Outlet stationary disc 23 is set in a recess within outlet flange 5. Anti-rotation pins 41 protruding from both inlet and outlet stationary discs engage the respective flanges in which they are set. The pins can be seen more clearly in FIG. 3. The wear parts are urged together by packing nut 42 which is screwed into outlet flange 5 and torqued to a desired setting. Alternatively, the wear parts could be made thicker and the force urging them together could be applied at bolts 2, the bolts which hold the valve housing together.

There are numerous seals surrounding the wear parts and rotor 8 and they have been designated generally by "X" in FIG. 6. Proper sizing and selection of suitable material is within the knowledge of those with skill in the art. Examples of suitable materials are Fluoromyte ® manufactured by Parker Seal Group, Packing Division, and Viton ® manufactured by DuPont de Nemours and Company, Inc.

Shaft 6 of mechanical actuator 4 is shown with dashed lines in the lower right of FIG. 6. Shaft 6 has coupling 43 for insertion of a socket wrench. When using mechanical actuator 4, hydraulic bypass 44 is opened allowing hydraulic fluid to flow freely within the valve. Otherwise, rotor 8 is actuated by pumping hydraulic fluid through the high port passageway 45 and out the low port passageway 46 or vice versa.

Details of the hydraulic system are shown in FIGS. 7-10. The following passageways referred to are for hydraulic fluid. In FIG. 7, hydraulic fluid enters through high port passageway 45 and through port 47 in high piston 14A. There are four such ports spaced around on each piston. Fluid travels around the annular space between rotor 8 and high piston 14 and through passageway 48 from high port 17A to high port 17B. Passageway 48 is drilled through the cylinder wall of rotor 8. The hydraulic fluid forces both high pistons 14A and 14B inward, thereby urging thrust plate 11 against the ends of vane 9 creating a seal. The motive force to turn rotor 8 comes from high pressure hydraulic fluid flowing from around high piston 14 through port 49 and passageway 50, and out of the face of vane 9 at opening 51. Hydraulic fluid exiting opening 51 is contained on one side by vane 9 and on the other side by vane 3 of centerpiece 1. The pressure of the hydraulic fluid turns rotor 8 and forces hydraulic fluid on the opposite side of vane 9 through opening 52 located in the backside of vane 9. The discharge fluid flows from opening 52 through passageway 53 and out of port 54. From port 54, fluid flows around the annular space between low piston 13B and rotor 8. Low pressure hydraulic fluid discharging from around the annular space flow out low port 16B, and through passageway 55 and out port 16A on the other end of rotor 8. Port 56 in piston 13A allows hydraulic fluid to circulate back to a hydraulic pump (not shown) via low port passageway 46.

Rotation of rotor 8 is reversed by reversing the flow of hydraulic fluid as in FIG. 8. When high pressure hydraulic fluid is directed to low port passageway 46 low port pistons 13A and 13B are forced inward against thrust plate 11. However, high pressure fluid circulating around pistons 13A and 13B forces high pistons 14A and 14B outward against shoulders 57 and 58 located in the inlet and outlet flanges respectively. With the aforementioned exception, the mechanics of turning rotor 8 are the reverse of the description provided for FIG. 7.

Figure 9:
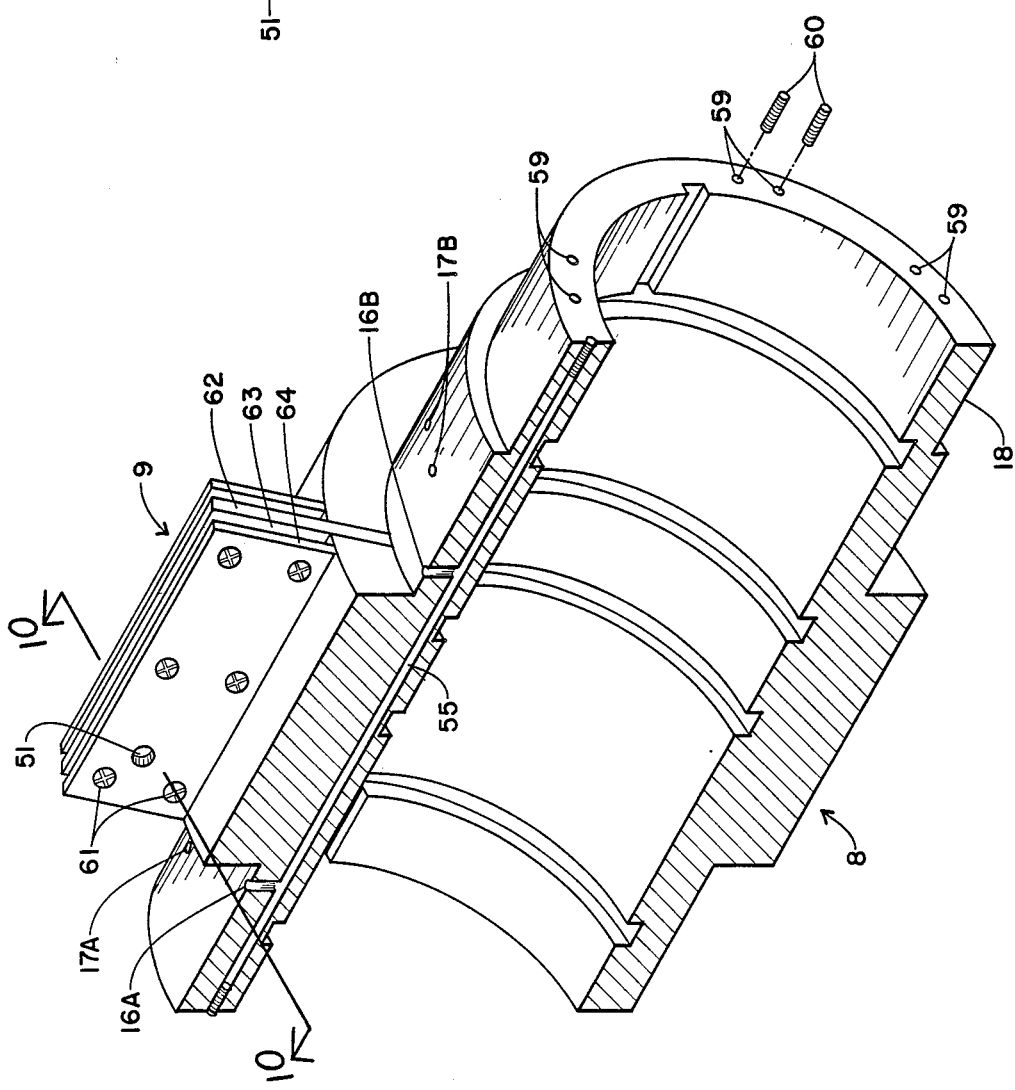
FIG. 9 is a cut away view of the rotor.

In FIG. 9, the details of constructing the hydraulic passageways are disclosed. For example, passageway 55 between low ports 16A and 16B is shown in the cut away view of rotor 8. Passageway 55 is created by drilling through the cylinder walls at either end of rotor 8. Drill holes 59 at each end of rotor 8 are later plugged by set screws 60. In the preferred embodiment there are two passageways such as 55 connecting two pairs of low ports and two passageways such as passageway 48 connecting two pairs of low ports. Additionally there is a passageway drilled from each end of rotor 8 for each of vanes 9 such as passageways 50 and 53 shown in FIGS. 7 and 8.

Figure 10:
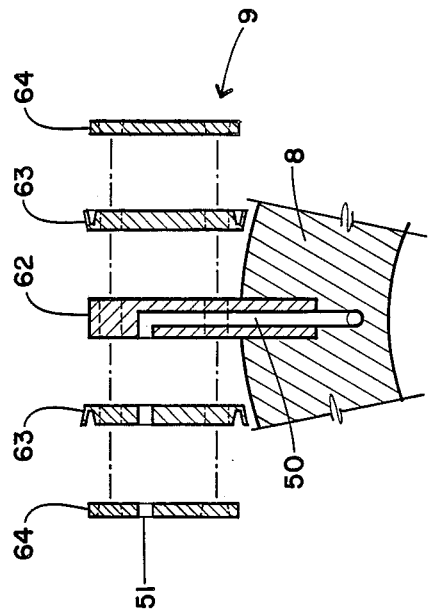
FIG. 10 is an exploded, cross section of the vane.

Screws 61 in vane 9 sandwich a gasket between a base and coverplate. FIG. 10 shows an exploded cross section of vane 9 which is made up of base 62 attached to rotor 8 and gasket 63 held by cover plate 64. Gasket 63 is cup shaped around its edges so that hydraulic fluid pressing against gasket 63 will enhance the seal. Base 62 is anchored to rotor 8 by long screws (not shown) extending from the outer edge of base 62 down into rotor 8.

The cross section in FIG. 10 exposes passageway 50 to opening 51. A similar passageway from the other end of rotor 8 directs hydraulic fluid to the opposite side of vane 9.

There are, of course, many alternate embodiments and modifications of the invention which are intended to be included in the following claims.

What I claim is:

1. A valve for high pressure fluids, comprising:
   (a) a housing having:
      (i) a cylindrical internal chamber wherein an end of said chamber is a smooth face aligned perpendicular to an axis of said chamber, said face being uniform about said axis;
      (ii) a first passageway extending from a first opening in said housing to an opening in said face offset from said axis;
      (iii) a second passageway extending from a second opening in said housing through an opposite end of said chamber;
   (b) a cylindrical rotor, rotatable within said chamber and aligned with said axis, said rotor having:
      (i) a first end conforming to said face within said chamber and slidable thereon, said first end of said rotor having an opening offset from said axis at a radius corresponding to said opening in said face;

(ii) an internal passageway extending a length of said rotor from said opening in said first end to an opening in a second end of said rotor, wherein said opening in said second end is in communication with said second passageway in said housing, said first and second passageways in said housing and said passage through said rotor being in substantially a straight line; and (c) a rotor actuating means having:
(i) a first gear positioned on a circumference of said rotor, perpendicular to said axis;
(ii) a rotatable shaft supported by said housing, said shaft having an end exterior to said housing;
(iii) a second gear mounted on said shaft and engaged with said first gear; and
(iv) an indicator ring encircling said housing and rotatable relative thereto, said ring having an inside diameter with teeth engaging said second gear, said ring further having an outside diameter calibrated with respect to said housing.

2. A valve for high pressure fluids, comprising:
(a) a housing having:
(i) a cylindrical internal chamber wherein an end of said chamber is a smooth face aligned perpendicular to an axis of said chamber, said face being uniform about said axis;
(ii) a first passageway extending from a first opening in said housing to an opening in said face offset from said axis;
(iii) a second passageway extending from a second opening in said housing through an opposite end of said chamber;

(b) a cylindrical rotor, rotatable within said chamber and aligned with said axis, said rotor having:
(i) a first end conforming to said face within said chamber and slidable thereon, said first end of said rotor having an opening offset from said axis at a radius corresponding to said opening in said face;
(ii) an internal passageway extending a length of said rotor from said opening in said first end to an opening in a second end of said rotor, wherein said opening in said second end is in communication with said second passageway in said housing; and (c) a rotor actuating means having:
(i) a vane extending radially outward from a side of said rotor;
(ii) an arcuate channel within said housing, having an inner surface defined by said side of said rotor, further having a cross section corresponding to a side of said vane, said vane partitioning said channel into first and second segments;
(iii) means to alternately direct hydraulic fluid to said first segment while releasing fluid from said second segment and direct hydraulic fluid to said seconds segment while releasing fluid from said first segment, thereby displacing said vane and turning said rotor.

3. A valve as in claim 2, wherein said hydraulic fluid directing means comprises:
(a) a first hydraulic passageway extending from a first port in a wall of said rotor through said rotor and a base of said vane to a first opening in a first side of said vane in communication with said first segment;
(b) a second hydraulic passageway extending from a second port in said wall of said rotor through said rotor and a base of said vane to a second opening in a second side of said vane in communication with said second segment; and
(c) means for said first and second ports to alternately receive and discharge hydraulic fluid respectively.

4. A valve according to claim 3, wherein a first and second end of said arcuate channel are first and second annular thrust plates respectively, said thrust plates are coaxial to and slidable on said rotor, and further comprising first and second pistons slidable on said rotor and positioned on exterior sides of said first and second thrust plates respectively, and means to direct hydraulic fluid to an exterior side of each of said pistons thereby forcing said pistons against said thrust plates.

5. A valve for high pressure fluids, comprising:
(a) a housing having:
(i) a cylindrical internal chamber aligned along an axis;
(ii) a first stationary wear part seated in said housing at an end of said chamber, said first stationary wear part having a smooth face uniform about said axis and aligned perpendicular to said axis facing said chamber, said first stationary wear part further having a first opening in said face offset from said axis and a passageway from said first opening to a second opening in an opposite side;
(iii) a second stationary wear part seated in said housing at an opposite end of said chamber, said second stationary wear part having a smooth face uniform about said axis and aligned perpendicular to said axis facing said chamber, said second stationary wear part further having a first opening in said face and a passageway from said first opening to a second opening in an opposite side;
(iv) a first passageway extending from a first opening in said housing to said second opening in said first stationary wear part;
(v) a second passageway extending from a second opening in said housing to said second opening in said second stationary wear part;

(b) a cylindrical rotor, rotatable within said chamber and aligned with said axis, said rotor having:
(i) a cylindrical sleeve;
(ii) a cylindrical center wear part fixedly positioned within said sleeve having a first end conforming to said face of said first stationary wear part and slidable thereon, said first end of said center wear part having an opening offset from said axis at a radius corresponding to said first opening in said face of said first stationary wear part; said center wear part further having an internal passageway extending a length of said center wear part from said opening in said first end to an opening in a second end, wherein said opening in said second end is in communication with said first opening face of said second stationary wear part; and (c) means connected to a circumference of said rotor sleeve for actuating rotation of said rotor; and
(d) means to urge said wear parts together comprising a hollow packing nut aligned with said axis and threaded into said second passageway between said second opening in said housing and said second stationary wear part and tightened against said opposite side of said second stationary wear part.

6. A valve according to claim 5 wherein said housing further comprises means to shield said wear parts from a direct impact of said fluid entering said valve.

7. A valve according to claim 6 wherein said means comprises an obstacle positioned to split a flow of said fluid.

8. A valve for high pressure fluids, comprising:
(a) a housing having:
- (i) a cylindrical internal chamber aligned along an axis;
- (ii) a first stationary wear part seated in said housing at an end of said chamber, said first stationary wear part having a smooth face uniform about said axis and aligned perpendicular to said axis facing said chamber, said first stationary wear part further having a first opening in said face offset from said axis and a passageway from said first opening to a second opening in an opposite side;
- (iii) a second stationary wear part seated in said housing at an opposite end of said chamber, said second stationary wear part having a smooth face uniform about said axis and aligned perpendicular to said axis facing said chamber, said second stationary wear part further having a first opening in said face and a passageway from said first opening to a second opening in an opposite side;
- (iv) a first passageway extending from a first opening in said housing to said second opening in said first stationary wear part;
- (v) a second passageway extending from a second opening in said housing to said second opening in said second stationary wear part;

(b) a cylindrical rotor, rotatable within said chamber and aligned with said axis, said rotor having:
- (i) a cylindrical sleeve;
- (ii) a cylindrical center wear part fixedly positioned within said sleeve having a first end conforming to said face of said first stationary wear part and slidable thereon, said first end of said center wear part having an opening offset from said axis at a radius corresponding to said first opening in said face of said first stationary wear part; said center wear part further having an internal passageway extending a length of said center wear part from said opening in said first end to an opening in a second end, wherein said opening in said second end is in communication with said first opening face of said second stationary wear part; and (c) means connected to a circumference of said rotor sleeve for actuating rotation of said rotor having:
- (i) a vane extending radially outward from a side of said rotor;
- (i) an arcuate channel within said housing having an inner surface defined by said side of said rotor, further having a cross section corresponding to a side of said vane, said vane partitioning said channel into first and second segments, said channel further having a first and second end formed by first and second annular thrust plates respectively, said thrust plates are coaxial to and slidable on said rotor and abut said vane;
- (iii) a first and second low piston, slidable on said rotor, forming a seal at an inside diameter with said rotor and at an outside diameter with said housing, and abutting said first and second thrust plates respectively on a side opposite said arcuate channel;
- (iv) a first hydraulic passageway through a wall of said rotor allowing hydraulic fluid to flow from said first low piston to said second low piston;
- (v) a first and second high piston, slidable on said rotor, forming a seal at an inside diameter with said rotor and at an outside diameter with said housing, and abutting said first and second low pistons respectively on a side opposite said thrust plates;
- (vi) a second hydraulic passageway through a wall of said rotor allowing hydraulic fluid to flow from said first high piston to said second high piston;
- (vii) a third hydraulic passageway through a wall of said rotor allowing hydraulic fluid to flow between said low pistons and said side of said vane;
- (viii) a fourth hydraulic passageway through a wall of said rotor allowing hydraulic fluid to flow between said high pistons and an opposite side of said vane; and
- (ix) means to alternately direct hydraulic fluid from a power source to said low pistons while receiving hydraulic fluid from said high pistons and direct hydraulic fluid from said power source to said high pistons while receiving hydraulic fluid from said low pistons.

* * * * *